(12) United States Patent
Headley et al.

(10) Patent No.: US 6,748,136 B2
(45) Date of Patent: Jun. 8, 2004

(54) WIDE BAND RAMAN AMPLIFIERS (75) Inventors: Clifford Headley, Flemington, NJ (US); Marc Mermelstein, Highland Park, NJ (US)

(73) Assignee: Fitel USA Corp., Norcross, GA (US)

( * ) Notice: Subject to any disclaimer, the term of this patent is extended or adjusted under 35 U.S.C. 154(b) by 117 days.

(21) Appl. No.: 10/098,200

(22) Filed: Mar. 15, 2002

(65) Prior Publication Data

US 2003/0174938 A1 Sep. 18, 2003

(51) Int. Cl.[7] .............................. G02B 6/26; G02B 6/28; H01S 3/30
(52) U.S. Cl. .............................. 385/27; 385/24; 359/334
(58) Field of Search .............................. 385/24, 37, 42, 385/123, 126–127, 27; 372/6, 43; 359/115, 124, 130, 341.32, 337, 177, 134, 161, 341.3, 334

(56) References Cited

U.S. PATENT DOCUMENTS 6,611,368 B1 * 8/2003 Grant et al. ................. 359/334

FOREIGN PATENT DOCUMENTS

| EP | 1 022 870 A | 7/2000 |
|---|---|---|
| EP | 1 148 666 A | 10/2001 |
| EP | 1 298 766 A | 4/2003 |

* cited by examiner

Primary Examiner—Frank G. Font
Assistant Examiner—Michael P. Mooney
(74) Attorney, Agent, or Firm—Peter V. D. Wilde (57) ABSTRACT The specification describes a distributed Raman amplifier with multiple pump sources for wide band amplification of wavelength division multiplexed (WDM) signals. It was recognized that using multiple pump sources introduces non-linear effects, such as four wave mixing (FWM). These effects are reduced by multiplexing the pump wavelengths in the multiple pump source. It was also recognized that not all of the pump wavelengths over the wavelength spectrum of the pumps contributes to FWM. Thus fewer than all of the pump wavelengths require multiplexing to eliminate FWM in the multiple wavelength pump source. Various approaches are described to ensure that the pump wavelengths do not interact in FWM in the transmission span. The selected individual pump wavelengths may be either time division multiplexed, or frequency modulated.

12 Claims, 7 Drawing Sheets

FIG. 13 time

WIDE BAND RAMAN AMPLIFIERS

FIELD OF THE INVENTION

This invention relates to Raman amplifiers, and more particularly to distributed Raman amplifiers with flat gain over a wide band of wavelengths.

BACKGROUND OF THE INVENTION

Optical transmission systems employ Wavelength Division Multiplexing (WDM) to increase information handling of an optical fiber transmission line, typically a long haul transmission line. Early WDM systems operated with a relatively narrow wavelength bandwidth, centered around 1550 nanometers, e.g. 1530–1565 nanometers, often referred to as the C-band. This is the wavelength region where standard silica based optical fibers have optimally low absorption.

In most WDM systems there is a trade-off between the number of channels the system accommodates and the channel separation. Both goals favor a wide operating spectrum, i.e. a wide range of operating wavelengths.

Recently, systems have been designed that extend the effective operating wavelength range well above the C-band transmission band. In terms of wavelength, the new band, referred to as the L-band, is variously defined, but for the purpose of this description is 1570–1610 nanometers. Use of these added wavelengths substantially extends the capacity of WDM systems. There is an ongoing effort to further extend the effective operating wavelength window to above 1610 nm, for example to 1620 nm. Success of these efforts will depend on finding components, for example amplifiers, that provide effective operation over this broad wavelength range.

In WDM systems, it is important to have uniform gain over the entire WDM wavelength band. This objective becomes more difficult to reach as the operating wavelength range is extended to longer wavelengths. Recently, new types of optical fiber amplifiers have been developed that operate using Raman scattering. The most prominent of these is a distributed amplifier that operates over the normal transmission span as a traveling wave amplifier. Raman scattering is a process by which light incident on a medium is converted to light at a lower frequency than the incident light. The pump photons excite the molecule up to a virtual level (non-resonant state). The molecular state quickly decays to a lower energy level emitting a signal photon in the process. Because the pump photon is excited to a virtual level Raman gain can occur for a pump source at any wavelength. The difference in energy between the pump and signal photons is dissipated by the molecular vibrations of the host material. These vibrational levels determine the frequency shift and shape of the Raman gain curve. The frequency (or wavelength) difference between the pump and the signal photon is called the Stokes shift. In Ge-doped silica fibers, the Stokes shift at which the maximum gain is obtained is ~13 THz. Due to the amorphous nature of silica the Raman gain curve is fairly broad in optical fibers.

Since Raman scattering can occur at any wavelength, this can be exploited to advantage in a telecommunication system that contains multiple signal wavelengths by using Raman pumps at several different wavelengths to amplify the signals. The gain seen by a given wavelength is the superposition of the gain provided by all the pumps, taking into account the transfer of energy between the pumps due to Raman scattering. By properly weighting the power provided at each of the Raman pump wavelengths it is possible to obtain a signal gain versus wavelength profile in which there is a small difference between the gain seen by different signal wavelengths (this difference is called the gain ripple or gain flatness).

A multiplicity of pumps has been used successfully in many different experiments. There is however one persistent problem with this approach. A deleterious nonlinear effect called four-wave mixing (FWM) can sometimes occur. In telecommunications systems, if FWM occurs in the signal band this may lead to transmission errors. As the number of pumps in a multi-pump wavelength Raman amplification scheme increases, the likelihood of FWM increases.

The harmful effects of four-wave mixing have been recognized. Recently one approach towards reducing these effects has been proposed [EP 1 148 666 A2]. In this approach the pump wavelengths are either time division multiplexed (TDM) together, or the frequency of the pump source is modulated (FM). Since the various pump wavelengths overlap for only a small distances along the fiber, FWM between the pump wavelengths should be eliminated or severely reduced.

While this approach would eliminate FWM, the nominal pump power requirements in this system are relatively high. Moreover, to TDM a relatively large number of pump wavelengths, some operating at relatively high power, adds significantly to the cost of the system. Reducing either of these requirements would significantly enhance the attractiveness of using multiplexed pump wavelengths to control deleterious FWM effects. In addition, a Raman amplifier that is effective in producing uniform and flat gain over the C+L-band would represent an important technological advance in DWDM system design.

STATEMENT OF THE INVENTION

The invention is based in part on an understanding that the FWM effect is not uniform for all pump wavelengths. We analyzed the pump wavelengths and powers required to provide a flat Raman gain to the C and L-band of a distributed Raman amplifier. From this analysis, certain pump wavelengths were identified where FWM is especially aggravated. Some wavelengths, the shortest wavelengths in the pump spectrum of the examples described below, produce little or no FWM. It was also observed that the power required at the longer wavelengths is significantly less than at the shorter wavelengths. This is because the shorter wavelengths pump the longer wavelengths in the transmission span. Following this understanding, the elimination of deleterious FWM can be realized by using TDM or FM only for the pump wavelengths that contribute to this process. The amount of power required by this TDM or FM scheme is reduced since it takes advantage of the pumping of the longer wavelengths by the shorter wavelengths in the transmission span. The longer wavelengths already have lower launch powers. Results include:

1) By TDM fewer pumps, the switching requirement on each pump is reduced, as well as the peak powers required.
2) The frequency range required of an FM source is reduced.
3) With fewer pumps to modulate the total cost of electronics decrease.
4) By narrowing the frequency range required for pump multiplexing, the demands on a swept wavelength source are reduced, making that option more attractive and feasible.

DETAILED DESCRIPTION

Figure 1:
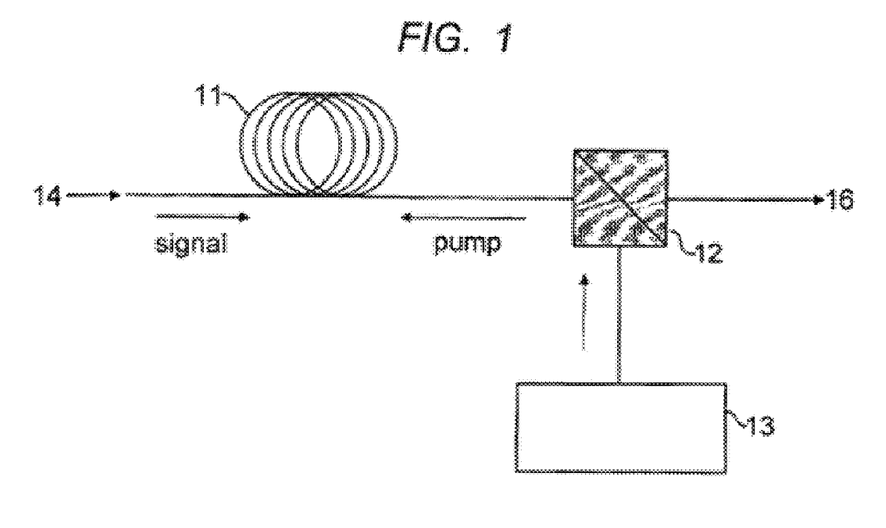
FIG. 1 is a simplified diagram of a Raman optical fiber amplifier.

Referring to FIG. 1, the arrangement shown represents a distributed Raman optical fiber amplifier structure with transmission span 11, most typically an optical fiber. The transmission span 11 represents a fiber of substantial length, typically in excess of 1 km. It will be evident to those skilled that the figures in this description are not drawn to scale, and the elements are schematically shown. For purposes of illustrating the details of the description, the preferred embodiment of the invention, i.e. a distributed amplifier where the amplifier medium is the normal transmission span is shown. The principles of the invention also apply to discrete amplifiers, where the amplification medium is a dedicated length of optical fiber, or other suitable traveling wave medium. The length of fiber represented by 11 is preferably at least 500 m in length to allow for the optical interactions that produce signal amplification. The amplifier is typically end pumped, and counterpumped, as shown in the figure by pump source 13 coupled into the core of the fiber through coupler shown schematically at 12. Typical pump wavelengths are 14xx nanometers, but can also be at other wavelengths. The input signal is represented by 14, and the amplified signal output is shown at 16.

Figure 2:
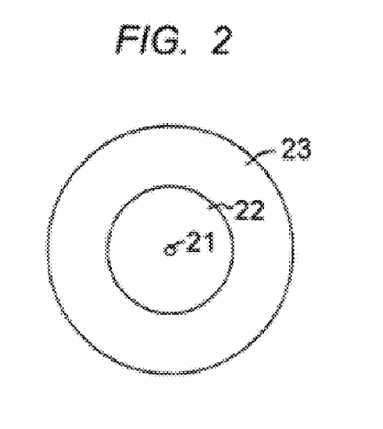
FIG. 2 is a schematic view of the optical fiber used in the amplifier of FIG. 1.

Referring to FIG. 2, an end of the optical fiber is shown. This view is also representative of a cross section taken at any position along the fiber. The fiber comprises a core 21 and a cladding 22. The core of the fiber is typically Ge-doped silica. Alternatively, it may be doped with phosphorus, or other index modifying impurities, or combinations of these. The cladding layer is preferably a high silica material, i.e. at least 85% $SiO_2$. In some preferred structures it may be pure silica, or fluorine-doped silica. The fiber also has a protective coating 23, typically a polymer coating.

The dimensions of the structure shown in FIG. 2 may vary substantially. The cladding layer diameter is typically in the range 50–400 $\mu$m, and preferably 70–300 $\mu$m. The core diameter is typically 2–12 $\mu$m.

Figure 3:
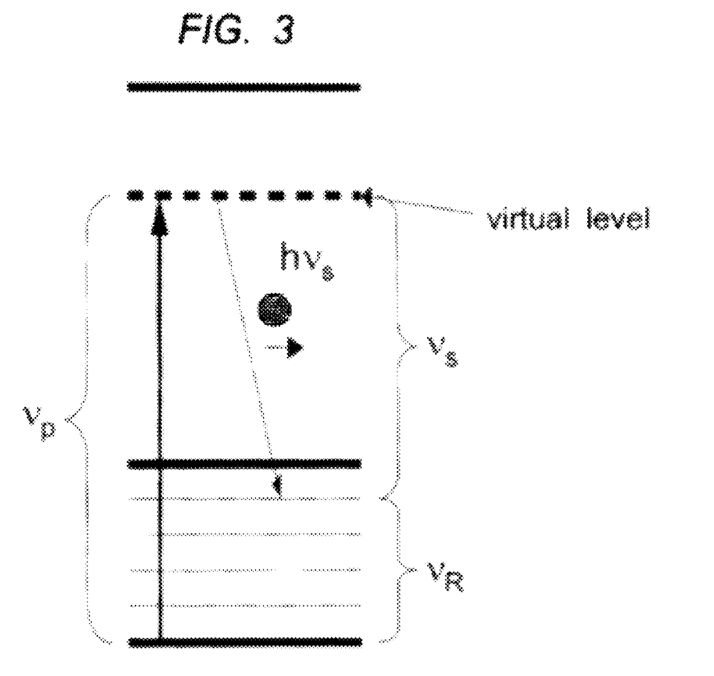
FIG. 3 is a schematic representation of the operation of an optical fiber Raman process.
Figure 4:
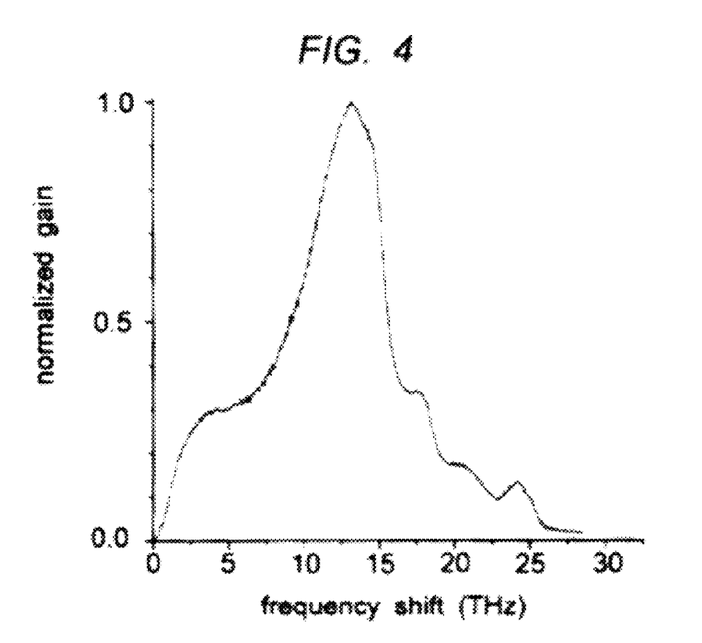
FIG. 4 is a curve showing the normalized Raman gain spectrum for a Ge-doped silica optical fiber.

Optical fiber Raman amplifiers operate on the principle that light scattered in a silica based optical fiber has a wavelength lower than that of the incident light. This is illustrated schematically in FIG. 3, where a pump photon, $v_p$, excites a molecule up to a virtual level (non-resonant state). The molecule quickly decays to a lower energy level emitting a signal photon, $v_s$, in the process. An important point to note is that, because the pump photon is excited to a virtual level, Raman gain can occur for a pump source at any wavelength. The difference in energy between the pump and signal photons is dissipated by the molecular vibrations of the host material. These vibrational levels determine the frequency shift and shape of the Raman gain curve. The frequency (or wavelength) difference between the pump and the signal photon is called the Stokes shift. In Ge-doped silica fibers, the Stokes shift at which maximum gain is obtained is ~13 THz. Due to the amorphous nature of silica the Raman gain curve is fairly broad in optical fibers. The normalized Raman gain spectrum for a Ge-doped optical fiber is shown in FIG. 4 as a function of frequency shift from the pump.

In a telecommunication system that contains multiple signal wavelengths Raman pumps at several different wavelengths may be used to amplify the signals, since Raman scattering can occur at any wavelength. The gain seen by a given wavelength is the superposition of the gain provided by all the pumps taking into account the transfer of energy between the pumps due to Raman scattering. By properly weighting the power provided at each of the Raman pump wavelengths it is possible to obtain a signal gain versus wavelength profile in which there is a small difference between the gain seen by different signal wavelengths. This difference is called the gain ripple or gain flatness, and may be expressed in dB as (Gmax−Gmin).

Figure 5:
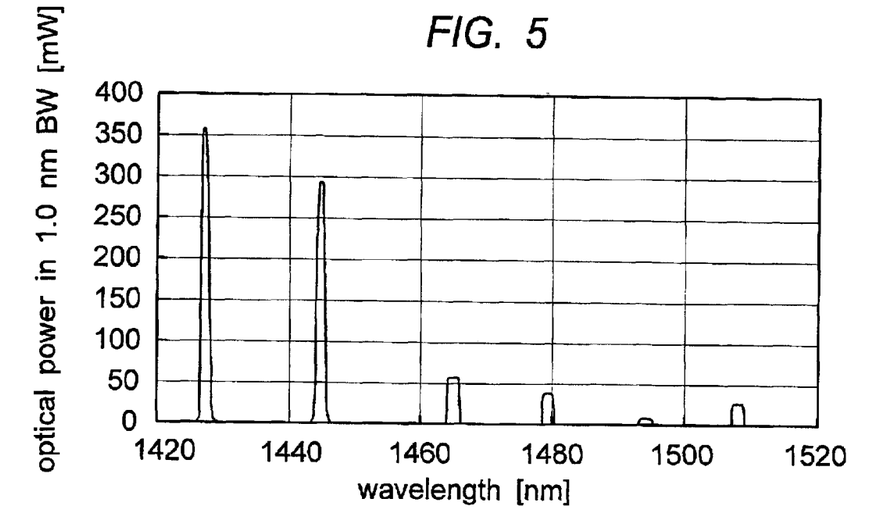
FIG. 5 is a plot of pump power vs. pump wavelength for a flat gain ripple in the C+L band of 140 km of optical fiber.
Figure 6:
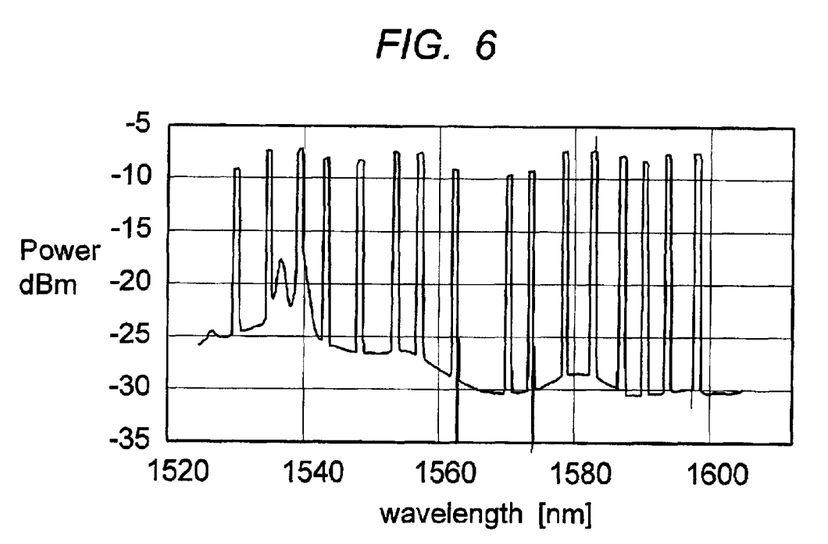
FIG. 6 is a plot of amplifier gain vs. pump wavelength using the pump of FIG. 5.

An example of a multiple pump system that is designed to produce a flat gain is shown in FIG. 5. Note that the power levels required at the longer wavelengths are significantly less than those at the shorter wavelengths. Use of this multiple pump arrangement in a WDM Raman amplifier produces the output WDM signal shown in FIG. 6, where a relatively flat gain is obtained over the C- and L-bands.

As described earlier, the use of multiple pumps introduces the problem of four wave mixing (FWM). Four-wave mixing occurs when photons of one or more waves combine to create photons at other frequencies. The new frequencies are determined as such that total energy and momentum (phase matching) is conserved. One possibility of this is shown schematically in FIG. 7. In the context of this description, the three wavelengths, vp1, vp2, and vp3, correspond to two or more individual pump wavelengths. It is significant to note that FWM results from non-linear interaction between three wavelengths which, in the illustration given here, are three pump wavelengths. It is also possible for FWM to occur with only two pump wavelengths, and a third wavelength from another source that travels in the medium.

In a telecommunications system, spurious wavelength components resulting from FWM in the signal band may lead to transmission errors. Unlike Raman scattering in which the phase matching conditions are automatically satisfied, the efficiency of FWM depends on a proper choice of frequencies and refractive indices. There are three contributions to the phase mismatch, material dispersion, waveguide dispersion and fiber nonlinearity. By manipulating the location of the zero dispersion wavelength (hence the waveguide dispersion) of the fiber, very efficient FWM can occur. In practice this translates to either having a pump wavelength near the dispersion zero of the fiber, or two pumps with wavelengths on either side of the dispersion zero. It therefore becomes clear that as the number of pumps in a multi-pump wavelength Raman amplification scheme increases the likelihood of FWM increases.

Figure 8:
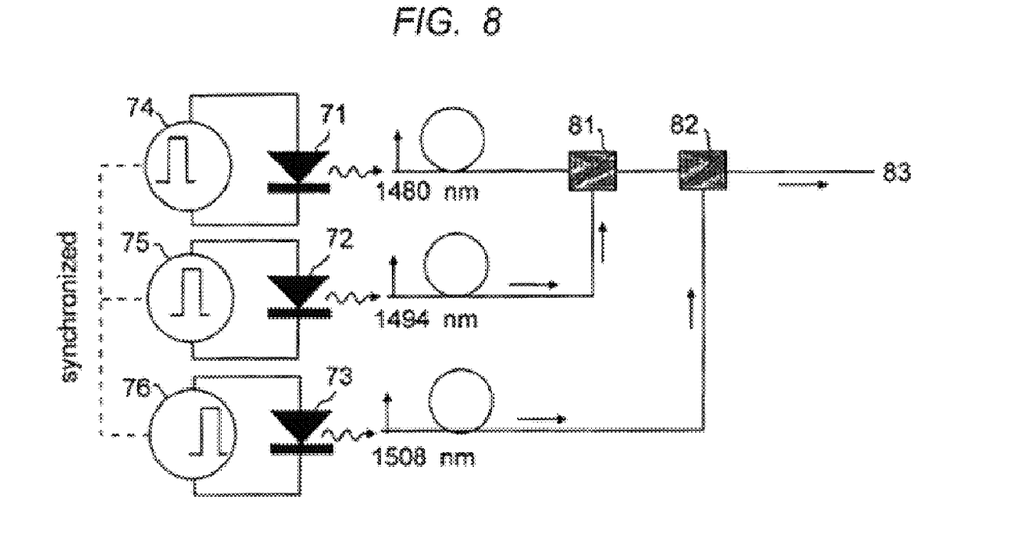
FIG. 8 is a schematic diagram of a multi-wavelength pump using time division multiplexed (TDM) pump wavelengths.

An effective approach towards reducing FWM effects is to time division multiplex (TDM) the multiple pump wavelengths. Since the various pump wavelengths overlap for only small distances along the fiber, FWM and other deleterious nonlinear effects arising from interactions between the pump wavelengths are eliminated or severely reduced. A TDM multiple pump source is shown schematically in FIG. 8. Laser diode pump sources 71, 72, and 73 operating at 1480 nm, 1494 nm, and 1508 nm, respectively, are synchronized together and multiplexed into separate time slots represented by 74, 75 and 76. Pump sources 71 and 72 are combined in WDM combiner 81, and pump source 73 is added to 71 and 72 at WDM combiner 82. While the approach represented by FIG. 8 will aid in controlling FWM and other deleterious nonlinear effects, there are several problems with it.

1) First large amounts of peak pump powers are required in order to maintain the same gain flatness. This can lead to other detrimental nonlinear effects.
2) As the number of TDM pumps needed increase, the switching speed requirements also increase. This also increases the peak power needed.
3) Likewise for a FM source. With an increasing wider range of signal wavelengths, the rate at which the source would have to be modulated and the power required both increase.
4) Modulating the diodes is more costly than running them with a constant output, for a TDM scheme this means the cost associated with the pump increases with the number of wavelengths.
5) For a FM scheme the large frequency range required is a severe constraint on the possibilities for developing such a source.

Figure 7:
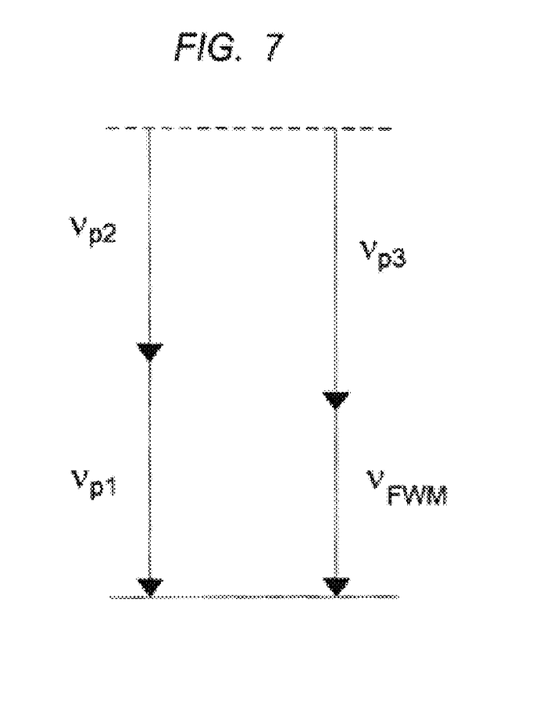
FIG. 7 is a schematic representation of one possible four-wave mixing (FWM) process.
Figure 9:
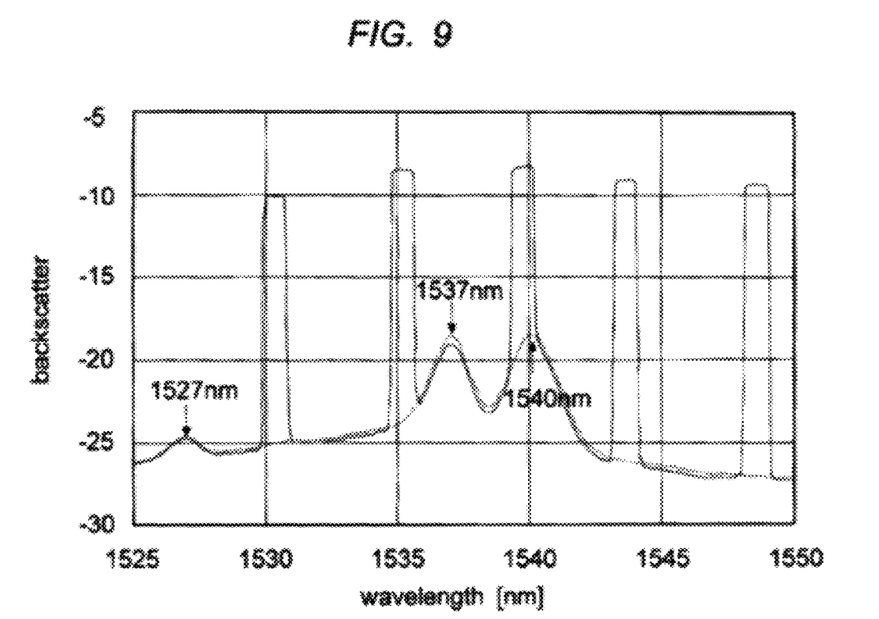
FIG. 9 is a plot showing the relationship between four-wave mixing and pump wavelength.
Figure 10:
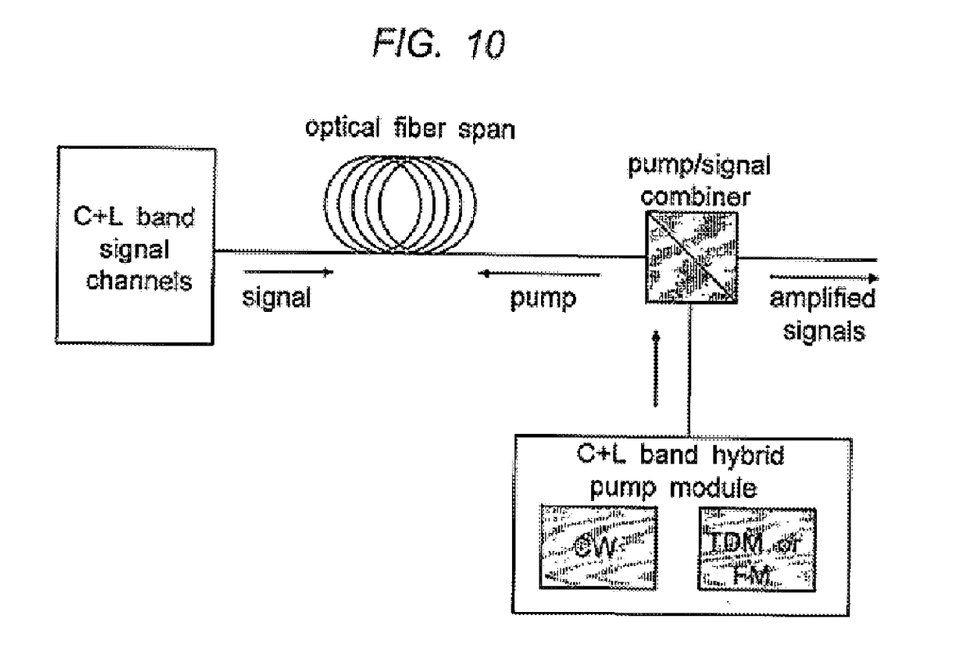
FIG. 10 is a schematic representation of a Raman amplifier using the principles of the invention.

Alleviating these conditions according to the invention follows two important discoveries. First, all of the pumps do not contribute to deleterious FWM. In one typical case, shown in FIG. 9, it is only the three longest wavelengths that are involved in the FWM mechanism. The figure shows backscattered energy vs. wavelength in nanometers for five WDM channels in the wavelength range of 1525 nm to 1550 nm. There are two curves, the solid curve represents backscatter with no signal, and the dashed curve represents backscatter with the signal on. The pump wavelengths are at 1445 nm, 1466 nm, 1480 nm, 1494 nm, and 1508 nm. This illustration involves only part of the C-band, but other portions of the C+L-band will show qualitatively similar effects. Analysis shows that the backscatter peak at approximately 1527 nm is the result of FWM between the pump wavelengths 1508 nm, 1494 nm and 1480 nm. With reference to FIG. 7, these correspond to vp1, vp2, and vp3 respectively. The peak at 1527 corresponds to vFWM. The peak at approximately 1537 nm is the result of FWM where vp1 is 1494 nm, vp2 is 1480 nm, and vp3 is 1445 nm. The peak at approximately 1540 nm is the result of FWM where vp1 is 1508 nm, vp2 is 1494 nm, and vp3 is 1466 nm. From FIG. 7 it will be understood that all three pump wavelengths are necessary to produce the FWM peaks in FIG. 9. The recognition that the longer wavelengths are the main participants in the FWM for all three peaks, leads to one aspect of the invention. By multiplexing just the longer wavelengths, i.e. 1480 nm, 1494 nm, and 1508 nm, ensures that there is no time when all of the wavelengths necessary for FWM are present simultaneously. Therefore it is not necessary, in order to obtain the advantages of TDM multiple pump sources, to TDM ALL the multiple pump sources. With proper selection, fewer than all can be multiplexed. The remaining pumps are operated CW. A system based on these principles is shown in FIG. 10. This results in a significant advance in terms of the factors enumerated above. Once it is recognized that fewer than all of the pump sources need to be multiplexed, the selection of those is straightforward. The measurements implicit in FIG. 9 follow well-known principles, and may be confirmed empirically.

Figure 11:
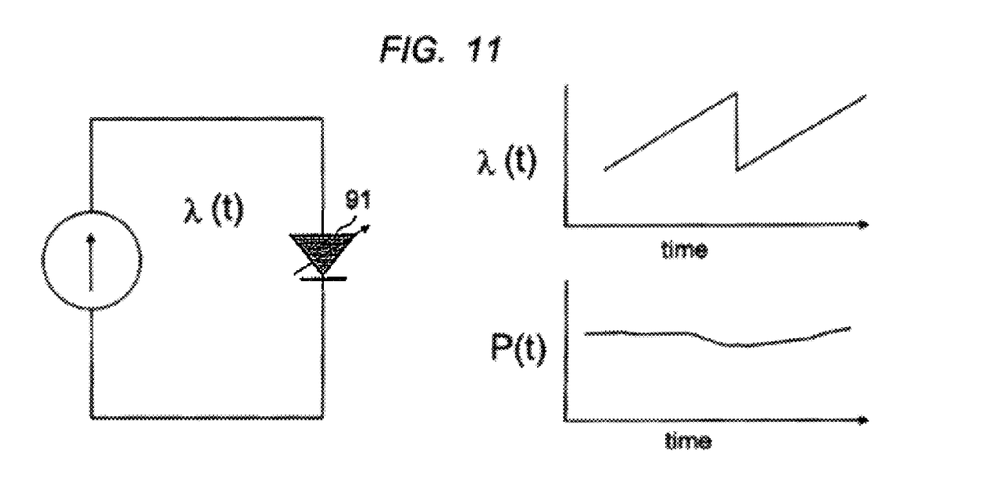
FIG. 11 is a schematic representation of a frequency modulated (FM) multi-wavelength pump.

Similar objectives may be reached by using an alternative to TDM, i.e. using a frequency modulated pump source. By sweeping through the multiple pump wavelengths with a single source diode, only one wavelength is launched at a time, thus eliminating the potential for FWM. This approach is illustrated in FIG. 11, where a swept frequency source 91 is used in place of the multiple diodes 71–73 of FIG. 8. This approach is simpler in some ways to implement, but wideband single sources are not as well developed, as are components for the system of FIGS. 8. However, with the advent of these components the systems of the invention may be implemented as effectively, or even more effectively, with FM approaches. It is significant to point out that the wavelength range required for the swept wavelength source is reduced using the principles of the invention. For example, the swept diode of FIG. 10 (FM) and FIG. 11 may operate over the wavelength range 1480 nm–1508 nm while the remaining pumps operating in the 1420 nm–1480 nm range are individual diodes operating CW.

The multiple pump multiplexing technique is effective in a counter propagation configuration since the signal channels walk through the modulated pumps. If the pump powers are increased so as to compensate for the decreased interaction length, the path-averaged Raman gain is constant. The rate at which the TDM or FM source cycles through all the different pump wavelengths also has to be fast enough so that no gain dependent modulation of the signal power occurs. Past work on noise transfer from the pump to signal suggests that the overall repetition rate for all the pump wavelengths should be greater than 50 kHz. Each wavelength is then modulated approximately n times faster, where n is the number of wavelengths. Note that the modulation rate and required peak powers are linked. The higher the modulation rate the more peak power needed at a given wavelength.

In doing these analyses, it was also recognized that the pump power required at the longer wavelengths is significantly less than that at the shorter wavelengths. This is because the shorter wavelengths Raman pump the longer wavelengths in the transmission span. This then makes acceptable, from a power standpoint, the elimination of the deleterious FWM by only using TDM or FM at the longer pump wavelengths. To fully equalize the overall multiplexed source actually requires that the laser diode sources for the individual pump wavelengths be tuned to provide unequal power. This reduces the power requirements for the longer wavelength sources, and also reduces the overall pump power that is contained in the TDM pump source. Reducing overall pump power can have several important system advantages, which are well known in the art.

To obtain the benefit of Raman energy exchange between individual pumps requires that the length of the interaction be substantial, i.e. 1 km or more. This length may represent a transmission span operating in a distributed mode (typically longer than 1 km, i.e. 3–100 km) or may be an optical fiber used in a discrete amplifier device.

To summarize, reducing the number of multiplexed pump sources, has these advantages.

1) The amount of power required by the selective pump source multiplexing of the invention is reduced since it takes advantage of the pumping of the longer wavelengths by the shorter wavelengths in the transmission span. The longer wavelengths already have lower launch powers.
2) By reducing the amount of multiplexing, the switching speeds required of each pump and the required peak powers are reduced.
3) The frequency range required of an FM source is reduced.
4) With fewer pumps to modulate the total cost of electronics decrease.
5) By narrowing the frequency range the number of approaches towards developing a swept wavelength source increases.

Figure 12:
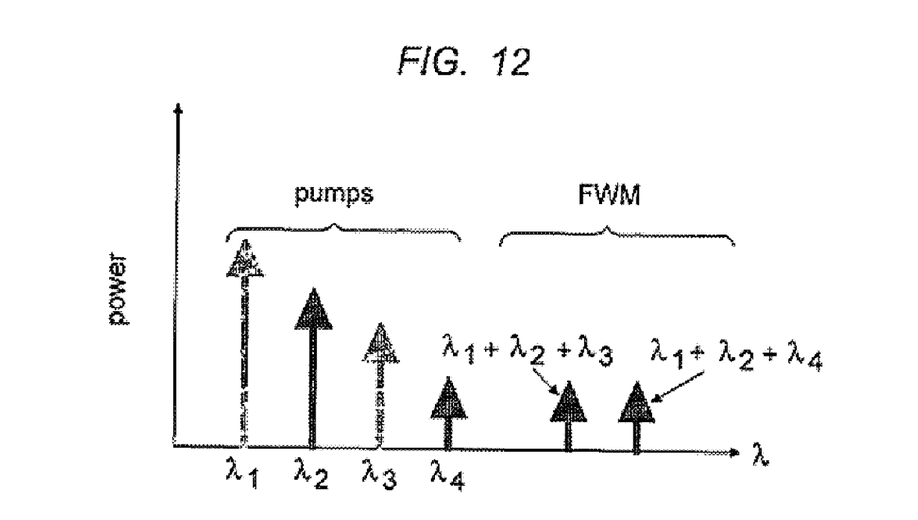
FIG. 12 shows an example of a paired pump source according to an alternative embodiment of the invention.
Figure 13:
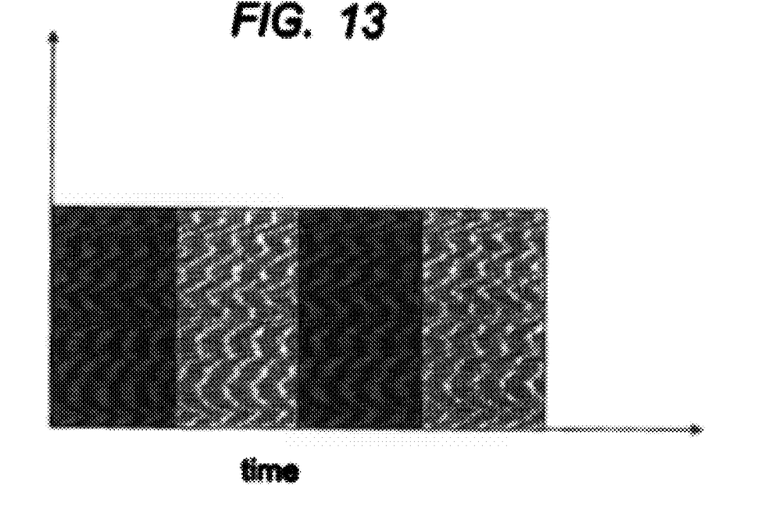
FIG. 13 shows the TDM pattern for the pump wavelengths of FIG. 12.

In the prior art approach, wherein all of the pumps in the multiple pump system are multiplexed, there is no Raman exchange of energy between the individual pumps. As shown above, these interactions can be useful in reducing the pump powers required for the longer wavelength pumps, i.e. those that are Raman pumped by the shorter wavelengths. A modification of the approach just described is to use multiple TDM or FM modulation patterns. Essentially this approach is based on the recognitions described above, but uses a different selection method for the pump signals that are multiplexed. This allows the device designer to use the Raman interactions between individual pump sources to advantage and still reduce or eliminate FWM effects. This is shown schematically in FIGS. 12 and 13. In this exemplary system, four pump wavelengths are used. Four-wave mixing components are generated by the combination of $\lambda_1+\lambda_2+\lambda_3$ and $\lambda_1+\lambda_2+\lambda_4$. If the modulation of the pumps at $\lambda_1$ and $\lambda_3$ overlap, and the modulation of the pumps at $\lambda_2$ and $\lambda_4$ overlap, all deleterious FWM could be eliminated. This modulation scheme is shown in FIG. 13. In addition the pump at $\lambda_1$ can still amplify that at $\lambda_3$ and that at $\lambda_2$ can pump that at $\lambda_3$ in the transmission span. The same approach could be used for two FM sources, in which one source sweeps from $\lambda_1$ to $\lambda_2$, while another sweeps from $\lambda_3$ to $\lambda_4$. In either case the transmission fiber is being used advantageously to amplify a time varying pump source.

Figure 14:
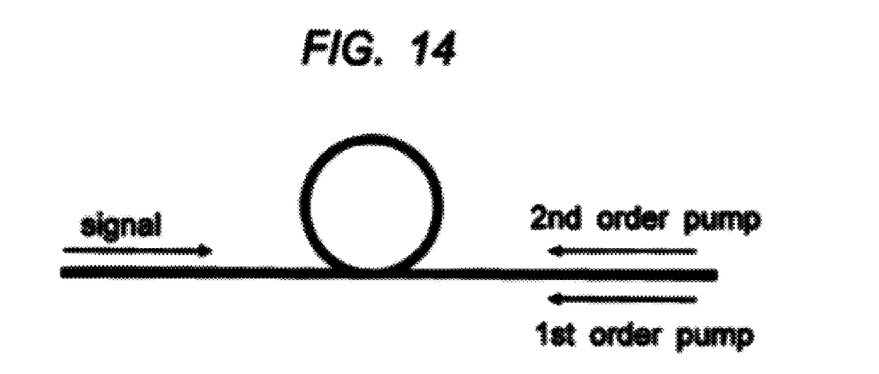
FIGS. 14 and 15 show alternative arrangements for the pump direction.
Figure 15:
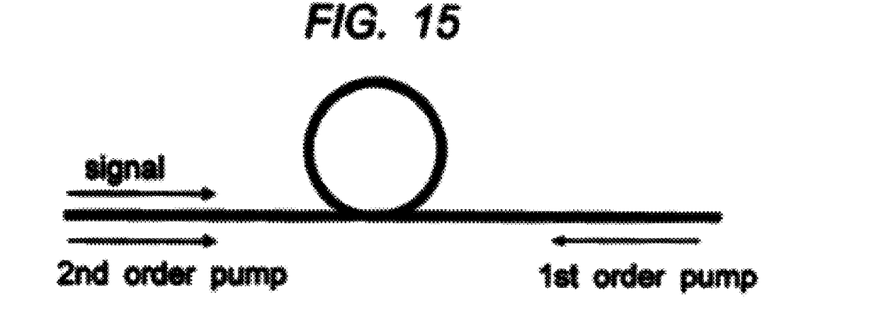

The concept of using the transmission span as an amplifier for the TDM or FM pump source can be extended into using multiple order pumps. The advantages of this approach was recently pointed out in (U.S. Pat. No. 6,163,630). In multiple order Raman pumping the signal light is greater than 1.5 Stokes shift away from the maximum gain frequency of the pump light. As an example in $2^{nd}$ order pumping, a pump wavelength 2 Stokes shifts away from the signal light is used to pump a $1^{st}$ order Stokes pump that is 1 Stokes shift away from the signal light. This is illustrated in FIGS. 14 and 15. Two configurations are illustrated. In the first case, FIG. 14, both a $1^{st}$ and $2^{nd}$ order pump are counter pumped relative to the signal light. It takes a finite length of fiber for the $2^{nd}$ order pump to be converted to the 1st order pump. The $1^{st}$ order pump then pumps the signal. This then allows the signal amplification to occur closer to the signal input end of the fiber. In a second embodiment of this approach, the 2nd order pump travels in the same direction as the signal (co-pumped) (FIG. 15), and the first order pump is counter pumped. The 2nd order pump pumps the first order pump at the input end of the fiber, which allows the 1st order pump to pump the signal. This again allows the Raman gain to occur closer to the signal input end of the fiber. Multiple order pumping is advantageous because in first order Raman pumping the pump generally travels in the opposite direction of the signal. Most of the amplification occurs near the signal output end of the transmission span. At this position in the fiber the signal power has already significantly degraded. If the Raman gain seen in the fiber can occur closer to the signal input end of the fiber an improved signal to noise ratio (SNR) and noise figure (NF) is obtained. The power needed for a second order pump is fairly modest. In one example of a dual order pumped system, the power ratio for a 1366/1455 nm pump was 970/10 mW respectively. With such low powers at 1455 nm this approach would also seem ideal for using a CW-TDM or CW-FM scheme, by taking advantage of the low power requirements.

Although originally conceived as a means of mitigating FWM there are several additional advantages to the invention. There is a significant cost reduction if one desired to update an existing system to expand operation over a over a wider bandwidth. Instead of replacing all of the current pumps one might only need to add a few additional pumps that can be modulated. Also by manipulating the pump pattern and or power levels, a certain degree of control of the gain flatness over some channels can be obtained. This would allow for different gain profile shapes. In addition, nonlinear effects such as FWM or supercontinuim generation can be reduced or eliminated by allowing selective modulation of pumps around the zero dispersion wavelength of the fiber.

Although the foregoing embodiments describe distributed Raman amplifiers operating in the C- and L-bands, the principles of the invention may be applied to Raman amplification of other wavelengths, e.g. the S-band. Therefore the range of signal wavelengths contemplated for the invention is 1490 nm to 1610 nm, and above. The range of pump wavelengths will typically be 1380 nm to 1520 nm, although other wavelengths may be found useful.

Suitable pump sources for implementing the invention are semiconductor diodes, e.g. Si, GaAlAs, InGaAs, InGaAsP. Semiconductor pump lasers are preferred but other pump sources, e.g. Nd-glass, Ti-sapphire, can be used.

In most cases it is contemplated that the amplifier of the invention will be counter-pumped. One of the examples above describes a counter pump and a co-pump, and typically some, if not all, counter-pumping will be used.

As described above, the invention may be implemented using either TDM or FM of fewer than all the amplifier pump sources. The term modulating, where used in this description or in the claims below, is intended to include both TDM and FM.

Various additional modifications of this invention will occur to those skilled in the art. All deviations from the specific teachings of this specification that basically rely on the principles and their equivalents through which the art has been advanced are properly considered within the scope of the invention as described and claimed.

We claim:

1. An optical system using Raman amplification comprising:
   a. a length of optical waveguide,
   b. lightwave signal means for introducing a lightwave signal into the optical waveguide, the lightwave signal comprising at least three wavelength division multiplexed (WDM) wavelengths, c. optical pump means for introducing lightwave pump energy into the core of the glass fiber, whereby the lightwave pump energy interacts with the lightwave signal to produce Raman amplification of the lightwave signal, the optical pump means comprising N individual pump sources, where N is at least 3, each operating at a different wavelength, the invention characterized by means for modulating N pump sources–X pump sources of the N individual pump sources, where X is at least 1 and where the X pump sources are selectively not modulated.

2. The fiber amplifier of claim 1 wherein the optical waveguide comprises a length of optical fiber.

3. The fiber amplifier of claim 1 wherein the lightwave signal travels in one direction in the optical fiber and the lightwave pump energy travels in the opposite direction.

4. The fiber amplifier of claim 1 wherein the N–x individual pump sources are time division multiplexed.

5. The fiber amplifier of claim 1 wherein the N–x individual pump sources are frequency modulated.

6. The fiber amplifier of claim in which N is at least 3 and x is at least 2.

7. The fiber amplifier of claim 2 wherein the optical fiber comprises Ge-doped silica.

8. The fiber amplifier of claim 1 wherein the N individual pump sources operate in the wavelength range 1380 nm to 1520 nm.

9. The fiber amplifier of claim 8 wherein the WDM wavelengths are in the range 1490 nm–1610 nm.

10. The fiber amplifier of claim 1 wherein the N individual pump sources are divided into at least two pairs P1 and P2, and the pairs are time division multiplexed.

11. The fiber amplifier of claim 1 wherein the N individual pump sources are divided into at least two pairs P1 and P2, and the pairs are frequency modulated.

12. The fiber amplifier of claim 1 wherein at least one of the N individual pump sources is at least 1.5 Stokes shift away from the maximum gain peak of one other of the N individual pump sources.

* * * * *